United States Patent
Morden et al.

(10) Patent No.: US 8,567,851 B2
(45) Date of Patent: Oct. 29, 2013

(54) VEHICLE COWL COVER

(75) Inventors: Thomas R. Morden, Clarkston, MI (US); Vinod Desai, Royal Oak, MI (US)

(73) Assignees: Nissan North America, Inc., Franklin, TN (US); Shape Corp., Grand Haven, MI (US)

( * ) Notice: Subject to any disclaimer, the term of this patent is extended or adjusted under 35 U.S.C. 154(b) by 110 days.

(21) Appl. No.: 13/242,389

(22) Filed: Sep. 23, 2011

(65) Prior Publication Data

US 2013/0076072 A1    Mar. 28, 2013

(51) Int. Cl.
   *B62D 25/08*    (2006.01)
(52) U.S. Cl.
   USPC ........................................ 296/192; 296/96.21
(58) Field of Classification Search
   USPC .............. 296/192, 96.21, 96.22, 187.09, 208
   See application file for complete search history.

(56) References Cited

U.S. PATENT DOCUMENTS

| | | | |
|---|---|---|---|
| 4,757,660 A | 7/1988 | Miyakawa et al. | |
| 5,456,049 A | 10/1995 | Goto et al. | |
| 5,533,779 A | 7/1996 | Epple et al. | |
| 7,182,397 B1 * | 2/2007 | Desai | 296/192 |
| 7,357,446 B2 | 4/2008 | Sakai et al. | |
| 2006/0186704 A1 * | 8/2006 | Sakai et al. | 296/192 |
| 2008/0246311 A1 * | 10/2008 | Hagino et al. | 296/192 |
| 2009/0146459 A1 * | 6/2009 | Watanabe et al. | 296/192 |
| 2010/0187862 A1 * | 7/2010 | Kurata et al. | 296/192 |

FOREIGN PATENT DOCUMENTS

| | | |
|---|---|---|
| EP | 1 775 200 A2 | 4/2007 |
| JP | 2008-201314 A | 9/2008 |
| JP | 2009-013412 A | 1/2009 |

OTHER PUBLICATIONS

"Windshield / Windowglass: Windshield Glass: Installation (2011 Highlander)", Model Year: 2011, Model: Highlander, Doc IDS: RM0000013KE03EX, Jan. 27, 2011.

* cited by examiner

*Primary Examiner* — Jason S Morrow
*Assistant Examiner* — E Turner Hicks
(74) *Attorney, Agent, or Firm* — Global IP Counselors, LLP

(57) ABSTRACT

A vehicle cowl cover includes a windshield support portion and a channel portion. The windshield support portion includes a first windshield supporting wall and a second windshield supporting wall coupled to the first windshield supporting wall to define a windshield receiving cavity that is configured to receive a bottom edge of a windshield. The windshield receiving cavity extends in a lateral direction along the bottom edge of the windshield. The channel portion extends from the second windshield supporting wall and defines a water receiving channel that is configured to receive water that flows over a top edge of the second windshield supporting wall from the windshield receiving cavity. The channel portion is angled relative to an inner surface of the windshield to direct water laterally along the channel portion to at least one side edge of the vehicle cowl cover.

20 Claims, 8 Drawing Sheets

VEHICLE COWL COVER

BACKGROUND

1. Field of the Invention

The present invention generally relates to a vehicle cowl cover. More specifically, the present invention relates to a vehicle cowl cover including a channel for receiving water that flows over an edge of a windshield supporting wall.

2. Background Information

Vehicles, such as automobiles, trucks, SUVs, vans and so on, are designed to withstand a wide variety of weather and environmental conditions. Naturally, such vehicles are constructed to prevent or at least minimize the amount of water and debris that can accumulate on or within a vehicle. For example, rain water can collect and add weight to a vehicle, seep into various areas of the vehicle, or deposit residue when such water evaporates. Accordingly, rain water may need to be diverted so that the water does not collect within the body structure of the vehicle.

As known in the automotive industry, a cowl cover typically occupies a space between the vehicle hood and the vehicle windshield, and at least partially rests on the windshield. The fit between a cowl cover and windshield is typically designed to be as tight as possible. However, gaps or other inconsistencies will inevitably occur, thus causing water to penetrate the seal between the cowl cover and the windshield and accumulate on inner surfaces of the cowl cover. This accumulated water can potentially pass into a vehicle cowl area concealed by the cowl cover.

In view of the above, it will be apparent to those skilled in the art from this disclosure that there exists a need for an improved vehicle cowl cover. This invention addresses this need in the art as well as other needs, which will become apparent to those skilled in the art from this disclosure.

SUMMARY

In view of the state of the known technology, one aspect of the invention provides a vehicle cowl cover including a windshield support portion and a channel portion. The windshield support portion includes a first windshield supporting wall and a second windshield supporting wall coupled to the first windshield supporting wall to define a windshield receiving cavity that is configured to receive a bottom edge of a windshield. The windshield receiving cavity extends in a lateral direction along the bottom edge of the windshield. The channel portion extends from the second windshield supporting wall and defines a water receiving channel that is configured to receive water that flows over a top edge of the second windshield supporting wall from the windshield receiving cavity. The channel portion is angled relative to an inner surface of the windshield to direct water laterally along the channel portion to at least one side edge of the vehicle cowl cover.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
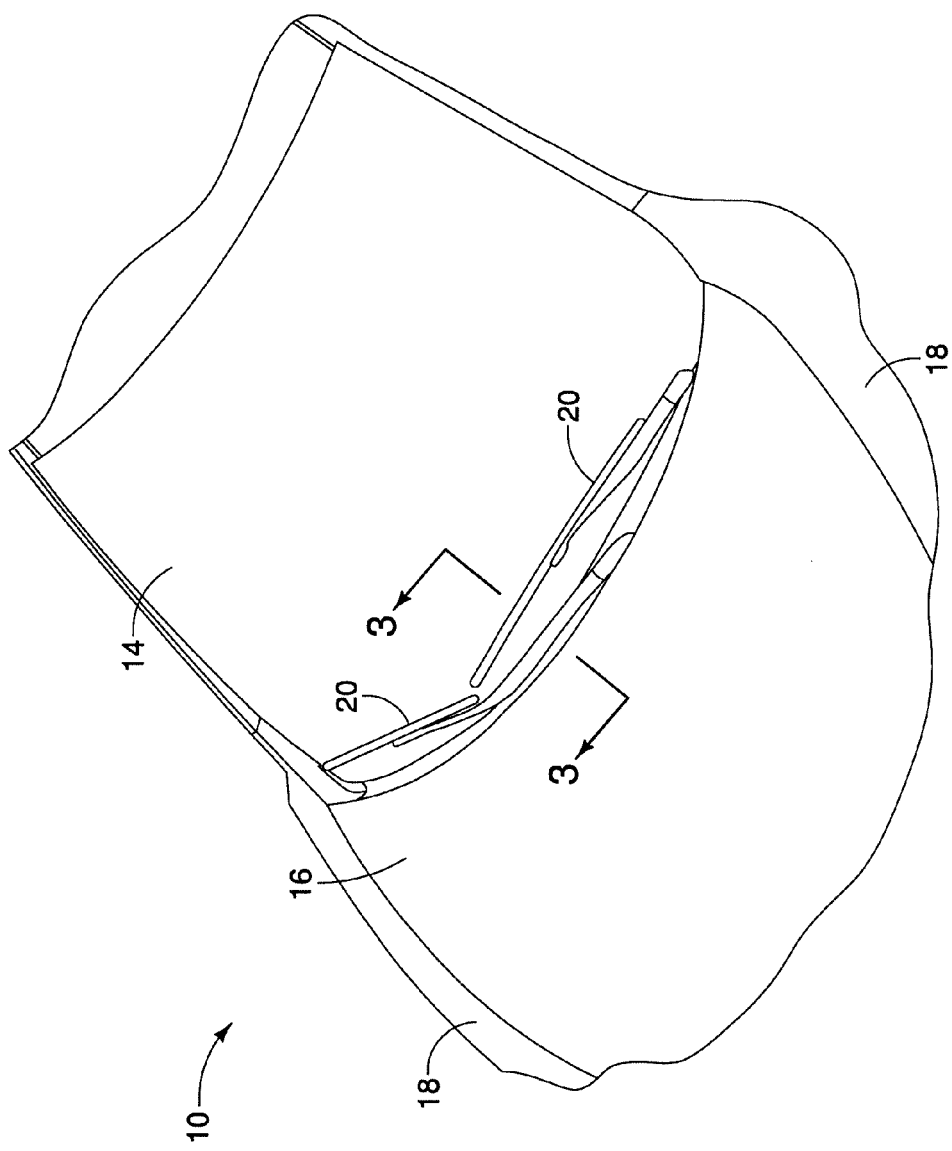
FIG. 1 is a perspective view of a vehicle front end including a vehicle cowl cover according to a disclosed embodiment.
Figure 2:
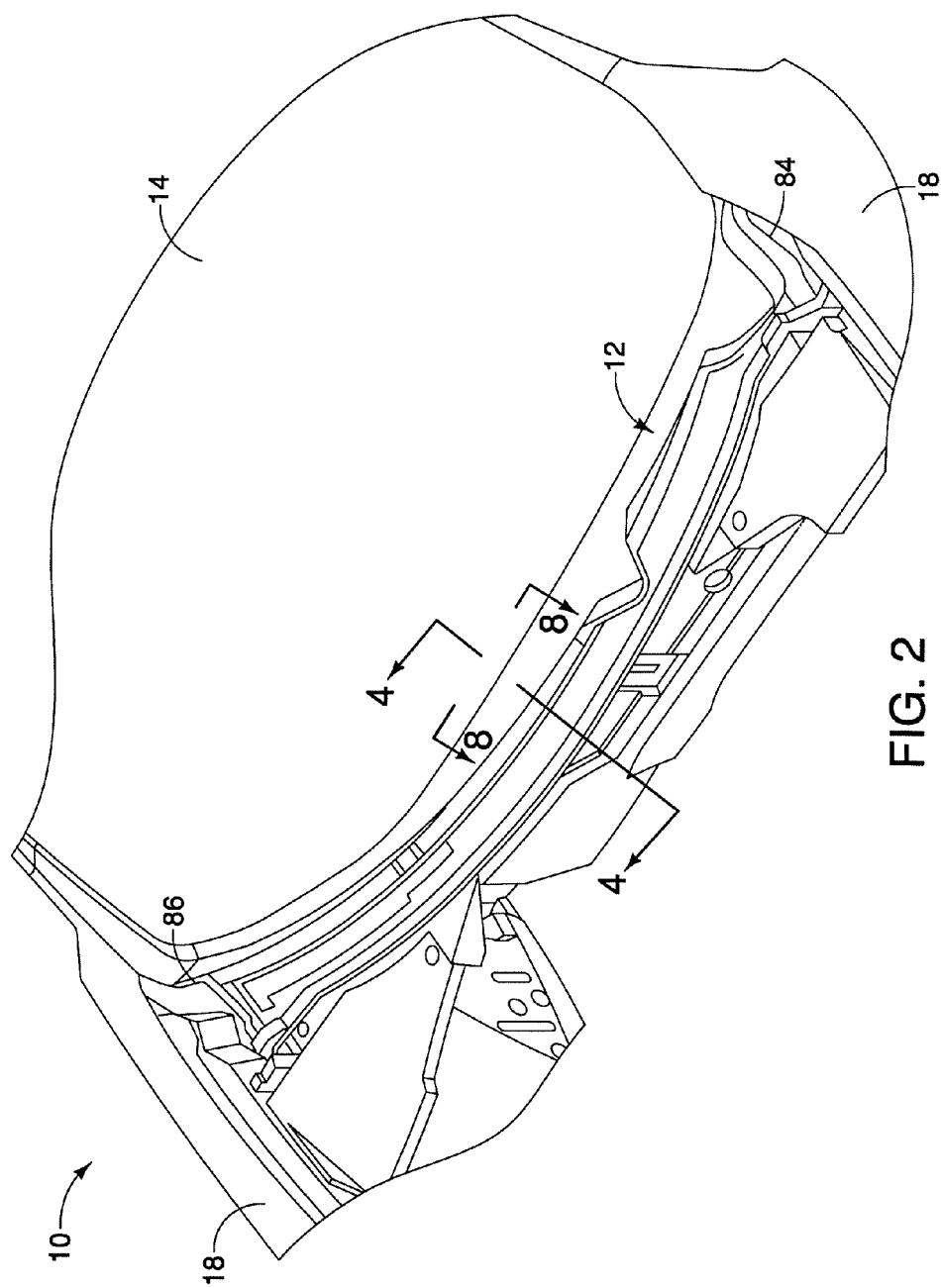
FIG. 2 is a perspective view of the vehicle front end as shown in FIG. 1 with the vehicle hood removed.
Figure 3:
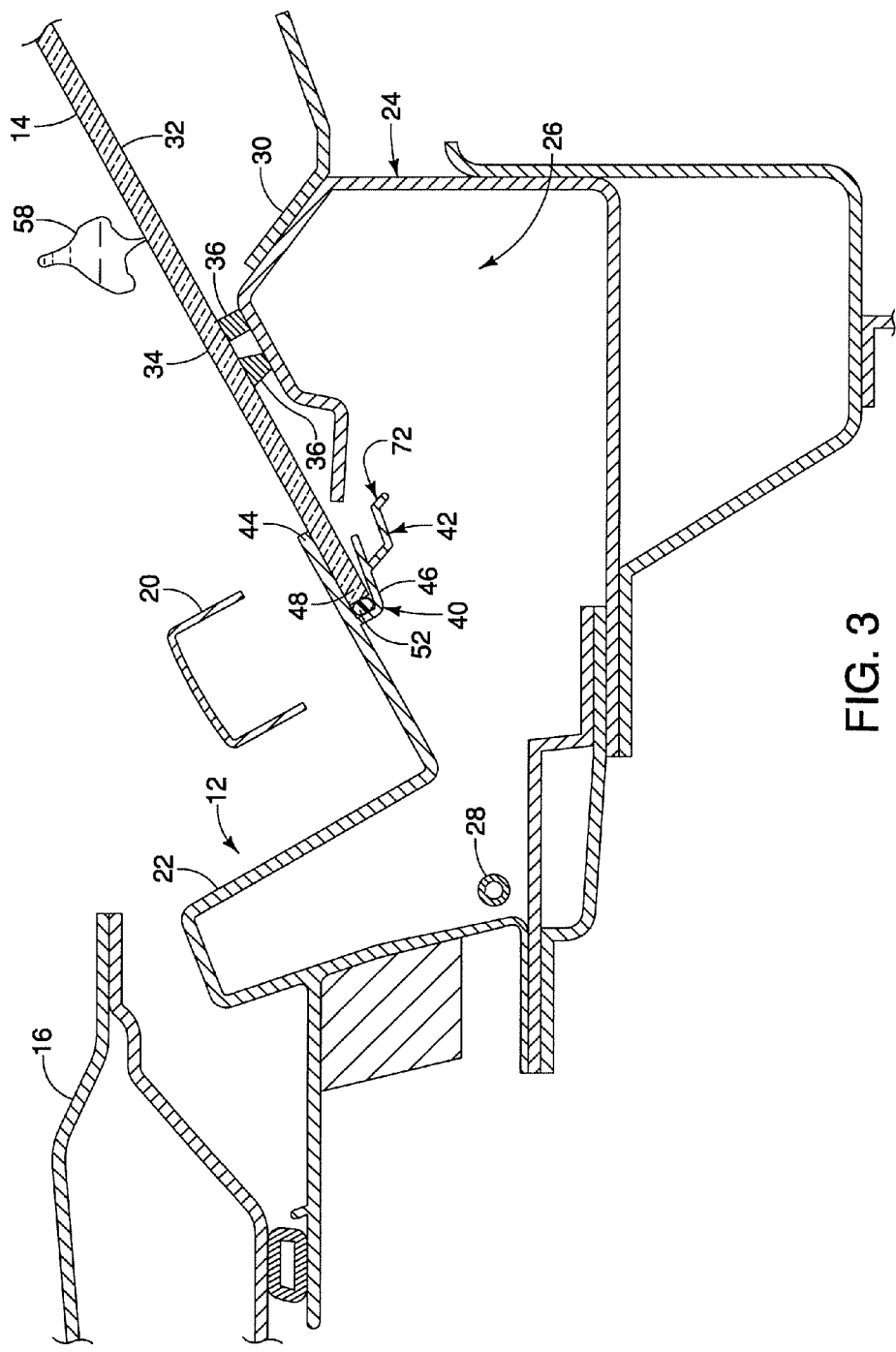
FIG. 3 is a cross-sectional view taken along lines 3-3 in FIG. 1.
Figure 4:
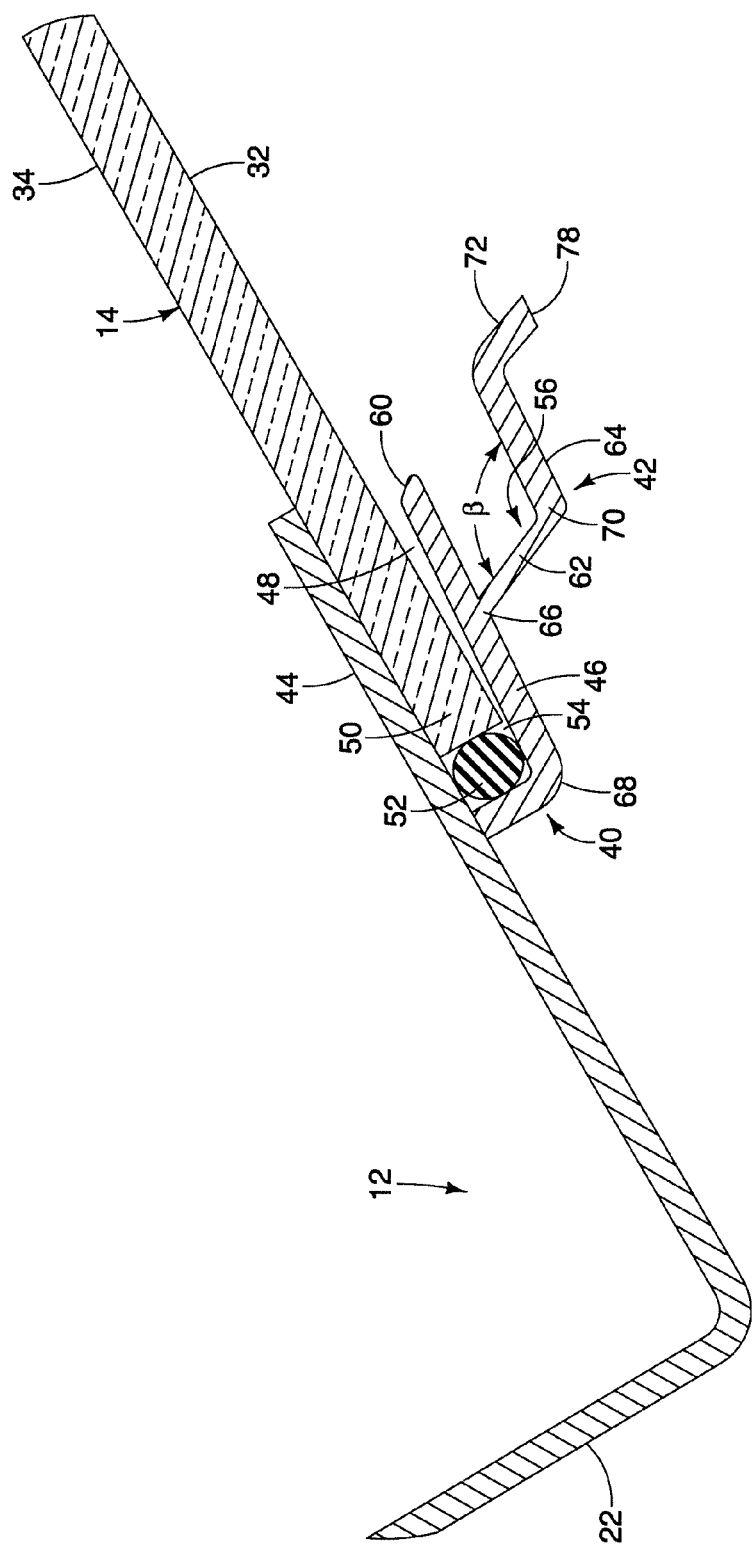
FIG. 4 is a cross-sectional view taken along lines 4-4 in FIG. 2.
Figure 5:
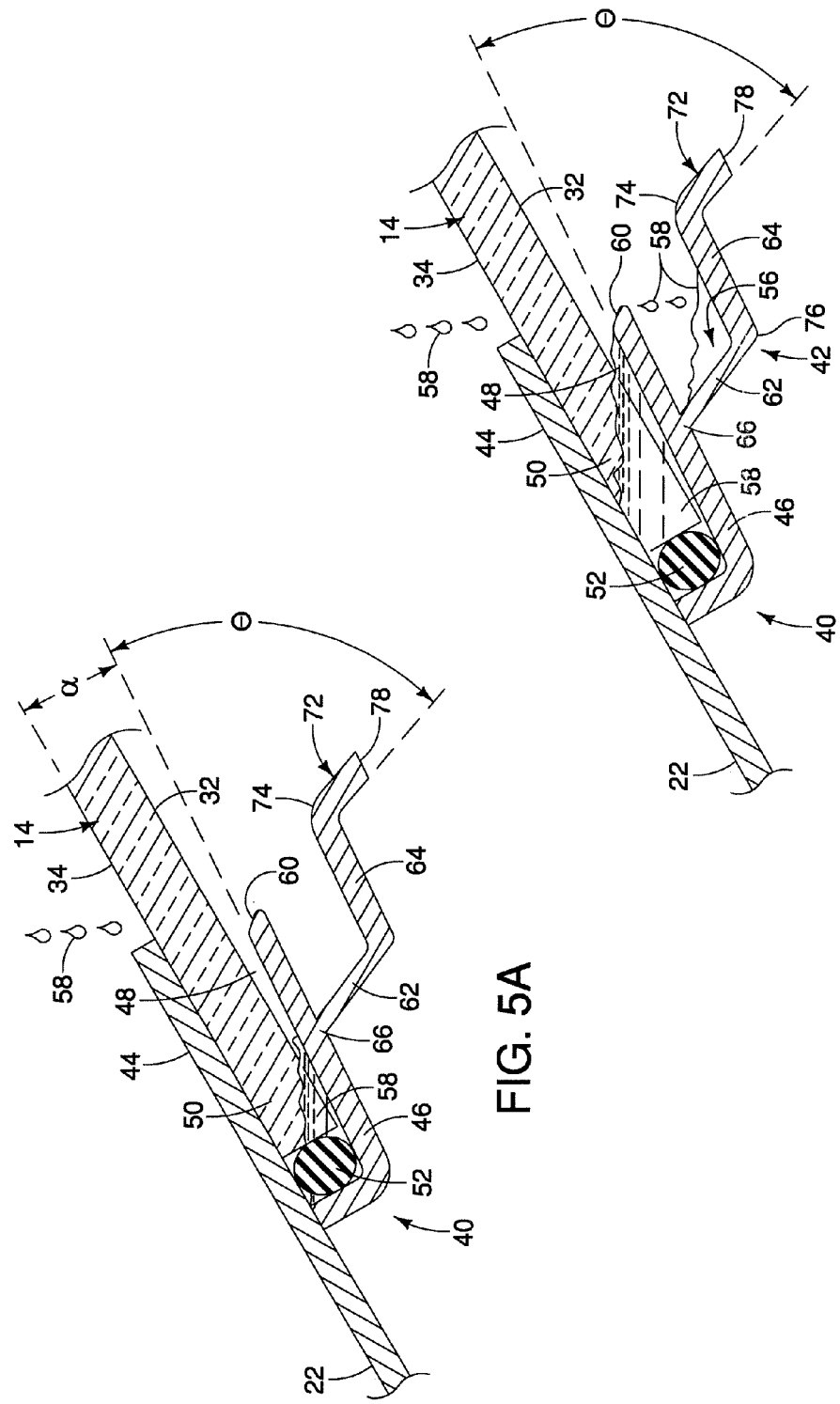
FIG. 5A is a detailed cross-sectional view illustrating water accumulation in a gap between the windshield and the windshield support portion of the vehicle cowl cover.
FIG. 5B is a detailed cross-sectional view illustrating further water accumulation in the gap between the windshield and the windshield support portion of the vehicle cowl cover spilling over onto the channel portion of the vehicle cowl cover.

Referring initially to FIGS. 1 and 2, an automotive vehicle 10 is illustrated with a vehicle cowl cover 12 according to an illustrated embodiment. The vehicle 10 is conventional, except for the vehicle cowl cover 12 as described herein. Accordingly, the vehicle 10 and its various parts will not be discussed and/or illustrated in detail herein, except as related to the vehicle cowl cover 12. The vehicle 10 can be any type of vehicle such as an automobile, truck, SUV, van and so on. As further shown, the vehicle 10 includes a windshield 14, a hood 16, fender panels 18 and windshield wipers 20, which can all be conventional as understood in the automotive art.

As seen in FIGS. 3 through 8, the vehicle cowl cover 12 includes a main body 22 that at least partially covers a cowl box 24. The vehicle cowl cover 12 can be made of plastic, composites or any other suitable material. Also, the vehicle cowl cover 12 can be configured as an integral one-piece unitary member, or as a plurality of components that are coupled together by snap fitting or by any suitable fastening means, such as adhesives, rivets, screws, bolts and so on. As understood in the art, the cowl box 24 defines an interior chamber 26 that can house the motors (not shown) for the windshield wipers 20, as well as the tubing 28 and other components associated with the windshield washers (not shown) of the vehicle 10. As shown, the cowl box 24 can extend under a portion of the dash structure 30 of the vehicle 10. Also, the windshield 14 has an inner surface 32 that faces an interior of the vehicle 10 and an outer surface 34 that faces an exterior of the vehicle 10. In this example, the cowl box 24 is offset from the inner surface 32 of the windshield 14 by spacers 36 that can be made of rubber or any suitable material as understood in the art. The spacers 36 can also be attached to the cowl box 24, the inner surface 32 of the windshield 14, or both by any suitable type of adhesive as understood in the art.

As further illustrated, the vehicle cowl cover 12 includes a windshield support portion 40 and a channel portion 42. The windshield support portion 40 includes a first windshield supporting wall 44 and a second windshield supporting wall 46 coupled to the first windshield supporting wall 44 to define a windshield receiving cavity 48. The first and second windshield supporting walls 44 and 46 extend from the main body 22 of the vehicle cowl cover 12. In this example, the second windshield supporting wall 46 extends at an angle α relative to the first windshield supporting wall 44 in a longitudinal direction of the vehicle 10. In particular, the second windshield supporting wall 46 extends at the angle α (shown in FIG. 5A) relative to the first windshield supporting wall 44 such that a top edge of the second windshield supporting wall 46 is spaced further apart from the windshield 14 than a top edge of the first windshield supporting wall 44. Thus, the windshield 14 at least partially rests on the second windshield supporting wall 46 while still making contact with the first windshield supporting wall 44. Also, the second windshield supporting wall 46 and the channel portion 42 are disposed in the interior chamber 26 of the cowl box 24 that is at least partially covered by the main body 22 of the vehicle cowl cover 12.

The windshield receiving cavity 48 is configured to receive a bottom edge 50 of the windshield 14. The windshield receiving cavity 48 extends in a lateral direction along the bottom edge 50 of the windshield 14 as shown. Furthermore, a sealing member 52 can be disposed at or near the bottom 54 of the windshield receiving cavity 48 along the entire length of the windshield receiving cavity 48. The sealing member 52 can be, for example, a weather stripping component made of rubber, a porous material that at least partially permits water flow through the sealing member 52 or any other suitable material as understood in the art. Accordingly, the sealing member 52 creates a barrier and/or defines a boundary for moisture between the outer surface 34 and the inner surface 32 at the bottom edge 50 of the windshield 14.

The second windshield supporting wall 46 and the channel portion 42 in this example extend continuously along a majority of a lateral direction of the vehicle cowl cover 12. As further shown, the channel portion 42 extends from the second windshield supporting wall 46 and defines a water receiving channel 56. The water receiving channel 56 is configured to receive water 58 that flows over a free edge 60 of the second windshield supporting wall 46 from the windshield receiving cavity 48.

The channel portion 42 has a channel base 62 that extends from the second windshield supporting wall 46 in a direction substantially perpendicular to the second windshield supporting wall 46, and a channel wall 64 that extends from the channel base 62 in a direction substantially perpendicular to the channel base 62. Accordingly, the channel wall 64 is angled at an angle β (shown in FIG. 4) relative to the channel base 62 to direct water 58 toward the channel base 62.

In this example, the channel portion 42 extends from a portion 66 of the second windshield supporting wall 46 that is spaced apart from the free edge 60 of the second windshield supporting wall 46. However, the channel portion 42 can be configured to extend from a portion of the second windshield supporting wall 46 that is at or proximate to the free edge 60. Alternatively, the channel portion 42 can extend from a lower edge 68 of the second windshield supporting wall 46 that is opposite the free edge 60. Furthermore, the channel base 62 and the channel wall 64 connect to each other at a location 70 aligned a portion of the second windshield supporting wall 46 between the lower edge 68 and the free edge 60.

In addition, a drip flange 72 is formed along an edge 74 of the channel wall 64 opposite from an edge 76 of the channel wall 64. The drip flange 72 extends away from the channel portion 42 to a free edge 78. In particular, the drip flange 72 extends in a first direction that is angularly offset by an angle θ from a second direction in which the second windshield supporting wall 46 extends in the longitudinal direction of the vehicle 10.

Figure 6:
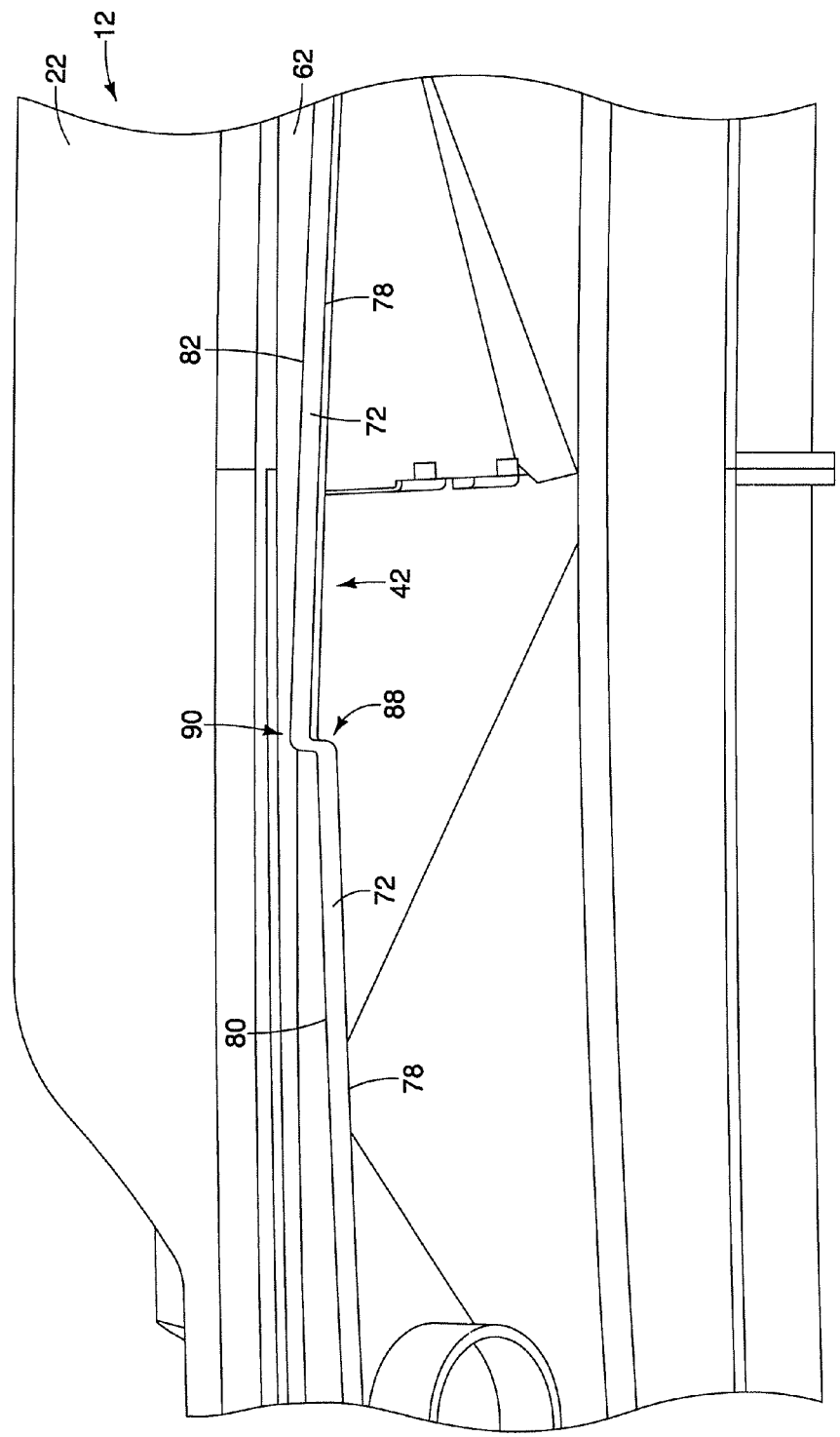
FIG. 6 is a rear elevational view taken in a direction toward the channel portion of the vehicle cowl cover.
Figure 7:
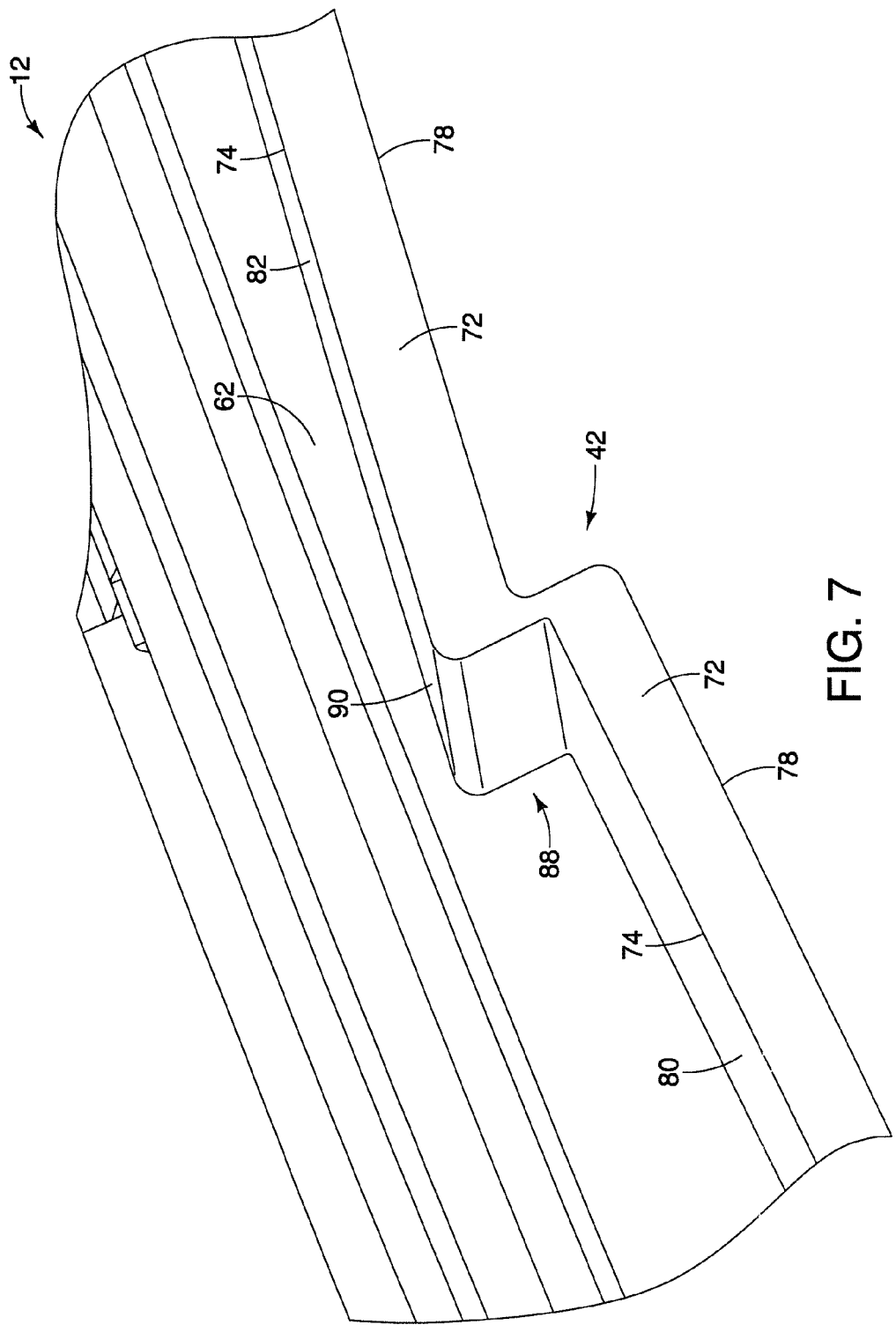
FIG. 7 is a detailed perspective view of the area of the channel portion that includes a stepped portion connecting first and second surface portions of the channel portion.
Figure 8:
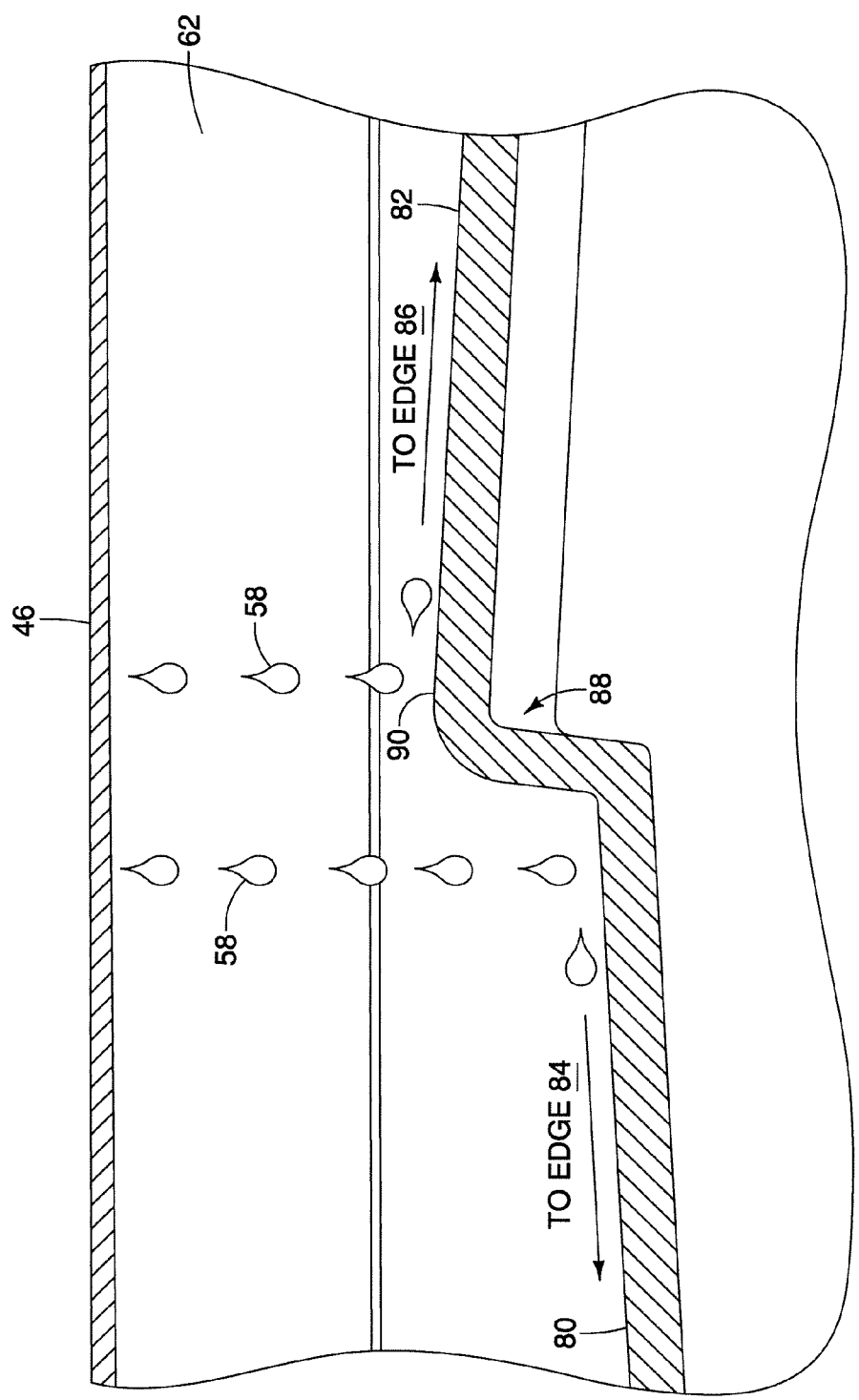
FIG. 8 is a detailed cross-sectional view of the stepped portion of the channel portion illustrating an example of the manner in which the first and second surface portions of the channel portion direct water along the channel portion.

As shown in more detail in FIGS. 6 through 8, the channel portion 42 is angled relative to the inner surface 32 of the windshield 14 to direct water laterally along the channel portion 42 to at least one outer edge of the vehicle cowl cover 12. In this example, the channel portion 42 is angled relative to the second windshield supporting wall 46 such that the channel portion 42 directs water laterally in two different directions along the channel portion 42 to opposite side edges of the vehicle cowl cover 12.

That is, the channel portion 42 includes a first surface portion 80 and a second surface portion 82. The first surface portion 80 is angled toward a first direction to direct the received water 58 laterally along the channel portion 42 to a first side edge 84 (see FIG. 2) of the vehicle cowl cover 12. The second surface portion 82 is angled toward a second direction to direct the received water 58 laterally along the channel portion 42 to a second side edge 86 (see FIG. 2) of the vehicle cowl cover 12 that is opposite of the first side edge 84.

Furthermore, the channel portion 42 includes a stepped portion 88 that connects the first and second surface portions 80 and 82. The stepped portion 88 is located adjacent to a midpoint between the first and second side edges 84 and 86, respectively, of the vehicle cowl cover 12. Thus, the first and second surface portions 80 and 82 meet at a location spaced apart from the first and second side edges 84 and 86, respectively, of the vehicle cowl cover 12. Moreover, the stepped portion 88 disposes an inboard end 90 of the second surface portion 82 along the channel wall 64 closer to the inner surface 32 of the windshield 14 than any portion of the first surface portion 80 along the channel wall 64.

Accordingly, as can be appreciated from the above, the arrangement of the windshield support portion 40 and the channel portion 42 prevents water from accumulating on inner surfaces of the vehicle cowl cover 12, or at least minimizes an amount of water than can accumulate in such locations. Consequently, the arrangement minimizes water penetration into the interior chamber 26 of the cowl box 24.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "outboard", inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle cowl cover comprising:
   a windshield support portion including a first windshield supporting wall and a second windshield supporting wall coupled to the first windshield supporting wall to define a windshield receiving cavity that is configured to receive a bottom edge of a windshield, the windshield receiving cavity extending in a lateral direction along the bottom edge of the windshield; and
   a channel portion extending from the second windshield supporting wall and defining a water receiving channel that is configured to receive water that flows over a top edge of the second windshield supporting wall from the windshield receiving cavity, with the channel portion being angled relative to an inner surface of the windshield to direct water laterally along the channel portion to at least one side edge of the vehicle cowl cover, the channel portion having a channel base that extends from the second windshield supporting wall and a channel wall that extends from the channel base, a distance between the channel base and the top edge of the second windshield supporting wall being less than a distance between the bottom edge of the windshield and the top edge of the second windshield supporting wall.

2. The vehicle cowl cover according to claim 1, wherein the second windshield supporting wall extends continuously between first and second side edges of the vehicle cowl cover.

3. A vehicle cowl cover comprising:
   a windshield support portion including a first windshield supporting wall and a second windshield supporting wall coupled to the first windshield supporting wall to define a windshield receiving cavity that is configured to receive a bottom edge of a windshield, the windshield receiving cavity extending in a lateral direction along the bottom edge of the windshield; and
   a channel portion extending from the second windshield supporting wall and defining a water receiving channel that is configured to receive water that flows over a top edge of the second windshield supporting wall from the windshield receiving cavity, with the channel portion being angled relative to an inner surface of the windshield to direct water laterally along the channel portion to at least one side edge of the vehicle cowl cover, such that the channel portion includes a first surface portion that is angled toward a first direction and a second surface portion that is angled toward a second direction to direct water laterally along the channel portion to respective opposite side edges of the vehicle cowl cover.

4. The vehicle cowl cover according to claim 1, further comprising
   a drip flange formed along an edge of the channel wall of the channel portion opposite of the channel base.

5. The vehicle cowl cover according to claim 4, wherein the drip flange extends in a first direction that is angularly offset from a second direction in which the second windshield supporting wall extends in a longitudinal direction of a vehicle including the vehicle cowl cover.

6. The vehicle cowl cover according to claim 4, wherein the drip flange extends away from the channel wall of the channel portion to a free edge.

7. The vehicle cowl cover according to claim 1, wherein the channel base extends from the second windshield supporting wall in a direction substantially perpendicular to the second windshield supporting wall and the channel wall extends from the channel base in a direction substantially perpendicular to the channel base.

8. The vehicle cowl cover according to claim 7, wherein the windshield support portion further includes a support base that couples the first and second windshield supporting walls, with the channel base of the channel portion being spaced further apart from a peripheral edge of the windshield than the support base.

9. A vehicle cowl cover comprising:
   a windshield support portion including a first windshield supporting wall and a second windshield supporting wall coupled to the first windshield supporting wall to define a windshield receiving cavity that is configured to receive a bottom edge of a windshield, the windshield receiving cavity extending in a lateral direction along the bottom edge of the windshield, and the second windshield supporting wall comprising a continuous curved surface in the lateral direction; and
   a channel portion extending from the second windshield supporting wall and defining a water receiving channel that is configured to receive water that flows over a top edge of the second windshield supporting wall from the windshield receiving cavity, with the channel portion being angled relative to an inner surface of the windshield to direct water laterally along the channel portion to at least one side edge of the vehicle cowl cover, the channel portion having a channel base that extends from the second windshield supporting wall in a direction substantially perpendicular to the second windshield supporting wall and a channel wall that extends from the channel base in a direction substantially perpendicular to the channel base, and the channel wall of the channel portion comprising at least two planar segments in the lateral direction.

10. The vehicle cowl cover according to claim 7, wherein the channel wall is angled relative to the channel base to direct water toward the channel base.

11. The vehicle cowl cover according to claim 7, wherein the channel base and the channel wall connect to each other at a location aligned with a portion of the second windshield supporting wall between the top edge and a bottom edge of the second windshield supporting wall.

12. The vehicle cowl cover according to claim 9, wherein the channel portion includes a first surface portion that is angled toward a first direction and a second surface portion that is angled toward a second direction to direct water laterally along the channel portion to respective opposite side edges of the vehicle cowl cover.

13. The vehicle cowl cover according to claim 3, wherein the channel portion includes a stepped portion that connects the first and second surface portions.

14. The vehicle cowl cover according to claim 13, wherein the stepped portion is spaced apart from both of the opposite side edges of the vehicle cowl cover.

15. The vehicle cowl cover according to claim 3, wherein the first and second surface portions meet at a location spaced apart from both of the opposite side edges of the vehicle cowl cover.

16. The vehicle cowl cover according to claim 3, wherein the channel portion has a channel base that extends from the second windshield supporting wall in a direction substantially perpendicular to the second windshield supporting wall and a channel wall that extends from the channel base in a direction substantially perpendicular to the channel base, with an inboard end of the second surface portion along the channel wall being closer to the inner surface of the windshield than any portion of the first surface portion along the channel wall.

17. The vehicle cowl cover according to claim 1, wherein the second windshield supporting wall extends at an angle relative to the first windshield supporting wall in a longitudinal direction of a vehicle including the vehicle cowl cover.

18. The vehicle cowl cover according to claim 17, wherein the second windshield supporting wall extends at the angle relative to the first windshield supporting wall such that the top edge of the second windshield supporting wall is spaced further apart from the windshield than a top edge of the first windshield supporting wall.

19. The vehicle cowl cover according to claim 1, further comprising
a main body, with the first and second windshield supporting walls extending from the main body of the vehicle cowl cover.

20. The vehicle cowl cover according to claim 19, wherein the second windshield supporting wall and the channel portion are disposed in an interior chamber of a cowl box that is at least partially covered by the main body.

\* \* \* \* \*